United States Patent [19]
Nazarian

[11] Patent Number: 5,553,974
[45] Date of Patent: Sep. 10, 1996

[54] ENHANCED VAPOR EXTRACTION SYSTEM AND METHOD OF IN-SITU REMEDIATION OF A CONTAMINATED SOIL ZONE

[76] Inventor: Djahangir Nazarian, 1427 S. Saltair Ave,#101, Los Angeles, Calif. 90025

[21] Appl. No.: 348,608

[22] Filed: Dec. 2, 1994

[51] Int. Cl.⁶ .................................................. B09B 3/00
[52] U.S. Cl. ..................................... 405/128; 166/268
[58] Field of Search ........................ 405/128; 166/268, 166/52; 299/4

[56] References Cited

U.S. PATENT DOCUMENTS

| | | | |
|---|---|---|---|
| 3,749,170 | 7/1973 | Riehl | 166/268 X |
| 5,076,727 | 12/1991 | Johnson et al. | 405/128 |
| 5,114,497 | 5/1992 | Johnson et al. | 405/128 X |
| 5,178,491 | 1/1993 | Graves et al. | 405/128 |
| 5,271,693 | 12/1993 | Johnson et al. | 405/128 |
| 5,342,147 | 8/1994 | Payne et al. | 405/128 |

*Primary Examiner*—David J. Bagnell
*Assistant Examiner*—Frederick L. Lagman
*Attorney, Agent, or Firm*—Walter Unterberg

[57] ABSTRACT

This invention is an enhanced vapor extraction system and method for in-situ remediation of soils contaminated with volatile organic compounds, weathered organic compounds and residual organics. The system consists of air influx wells installed around the periphery of the contaminated zone, an air extraction well installed within the contaminated soil zone and a vacuum pump or suction blower pulling on the extraction well and creating an air circulation which flows from the influx wells through the pore spaces of the contaminated soil to the extraction well. The shear action of the flowing air strips the contaminants from the soil surfaces and pore spaces and entrains them into the air stream for later disposal. The improvement consists of increasing the air velocity through the system to increase shear action and so the rate of contaminant removal. This is done without added vacuum pump or suction blower capacity, but by tapering the air influx wells from a maximum flow cross-sectional area at ground level to a minimum flow area at the depth of the contaminated soil. The maximum air velocity is obtained at the minimum flow area. The taper may be gradual (conical with tubular wells) or stepwise (a series of straight tubes of diminishing cross-sections). The net benefit is an increase in the stripping rate of the contaminants and a reduction in operating time and cost for a given remediation task, with only minor structural changes.

16 Claims, 3 Drawing Sheets

ENHANCED VAPOR EXTRACTION SYSTEM AND METHOD OF IN-SITU REMEDIATION OF A CONTAMINATED SOIL ZONE

BACKGROUND OF THE INVENTION

1. Field of the Invention

This invention relates to in-situ remediation of soils contaminated with volatile organic compounds. In particular, it relates to an improvement in an apparatus and method for vapor extraction of volatile organic compounds in soils.

2. Description of Related Art

Petroleum compounds, petroleum fractions and other organics have contaminated soils at thousands of sites due to spillage from above-ground sources or leakage from underground storage tanks. The spilled and leaked contaminants are adsorbed onto soil particles. Under the action of gravity these contaminants can reach great depths. If no efforts are made to remove these organic contaminants, they can migrate to aquifers where they threaten the purity of domestic, agricultural and industrial water supplies. The protection of groundwater sources and public health has become a major driving force in the enactment of laws and regulations to remediate such sites.

Applicable remediation systems include in-situ and ex-situ biological, chemical, thermal and physical systems. The high cost of excavating and transporting contaminated soils to an ex-situ treatment facility has focused attention on in-situ remediation systems. When the contaminating organic compounds have volatile components, a preferred physical in-situ remediation system is the soil vapor extraction system for reduction-or elimination of such contamination.

This system employs an air extraction well extending from the ground surface down to the contaminated soil zone, in conjunction with several air influx wells to a similar depth preferably located immediately outside the contaminated zone. An air displacement apparatus, such as an air extraction pump, pulls on the air extraction well and causes an air circulation downward in the influx wells, laterally through the contaminated soil zone, and upward in the extraction well.

To achieve the air circulation described above, each air influx well, typically a vertical cylindrical duct, has an opaque upper section down to the contamination zone, with a lower perforated section at the depth of this zone. The air flows down each influx well and through the perforations located near its bottom through the contaminated soil zone to the extraction well inlet. The extracted air carries with it volatile organic compounds stripped from the contaminated soil zone by the air circulation, and is usually directed to a utilization unit (such as an internal combustion engine) or an immobilization unit (such as an activated carbon bed) for contaminant disposal.

Usually, the cross-sectional flow area of the perforations is the same as the cross-section of the opaque upper section of the air influx well. A search in the recent (1991–1994) patent literature disclosed several vapor extraction systems showing the constant cross-section influx well geometry. Donnelly (U.S. Pat. No. 4,982,788) shows substantially parallel induction and extraction wells, with immobilization by a condenser and demister. Johnson et al. (U.S. Pat. No. 5,076,727) also disclose a constant flow area injection well, with moist air injection, and microwave/radio frequency heating of the soil to volatilize nonvolatile hydrocarbon contaminants. Johnson et al. (U.S. Pat. No. 5,114,497) show the same injection well geometry as in their patent cited immediately above, except that the soil is thermally heated and a vapor separation process is included. Graves et al. (U.S. Pat. No. 5,178,491) show constant-area cylindrical wells, here the flow consisting of a vapor phase nutrient for bio-remediation. Bentley (U.S. Pat. No. 5,332,333) discloses a cylindrical downflow conduit perforate at its lower end, with means to prevent contaminated water from being brought to the surface.

The vapor extraction process uses the stripping of volatile organic contaminants from soils by an air stream through the contaminated soil zone. The air velocity through the pore spaces of the contaminated zone gives rise to shear action which strips volatile compounds from the soil and entrains them into the air stream. When the air velocity is increased, the shear action within the soil increases and so does the rate at which the volatile compounds are stripped from the soil.

The state-of-the-art technology as shown in the above-mentioned patents relies on constant flow area air influx wells. With such a geometry and a given size of air displacement apparatus there is a limit to the air velocity within the air influx wells and through the contaminated soil zone, and hence to the rate of stripping of volatile compounds. It is an object of the present invention to produce higher air velocities and higher rates of stripping of volatiles for a given size air displacement apparatus by changes in the geometry of the flow system. Specific objects appear below.

OBJECTS OF THE INVENTION

It is an object of this invention to provide for more efficient and more complete removal of volatile organics from contaminated soils.

It is another object to increase the rate of removal of volatile organics from contaminated soils by an improvement in vapor extraction systems.

It is a further object to provide an improvement in vapor extraction systems whereby the rate of removal of volatile organics from contaminated soils is increased without an increase in the capacity of the air displacement apparatus.

It is still another object to provide an improvement in vapor extraction systems whereby the rate of removal of volatile organics from contaminated soils is increased without the addition of moving parts.

It is yet another object to provide for removal of less volatile residual compounds as well as weathered organics, from contaminated soils by the improved vapor extraction system.

It is another object to achieve a more complete removal of the total organic compounds in the contaminated soil zone.

It is a further object to reduce in-situ soil remediation time and costs, and increase the cost effectiveness of vapor extraction systems.

SUMMARY OF THE INVENTION

To implement the stated objects of the invention, an enhanced vapor extraction system has been devised. The prominent feature of this enhanced system is the provision of an increase in air flow velocity through the system without the addition of moving parts or additional capacity of the air displacement unit. This increase in velocity enhances the shear action of the air as it flows through the pore spaces of the contaminated soil zone. In turn, the higher shear action increases the rate of stripping and entrainment of volatile compounds, so that the removal rate of the soil contaminants is increased and the overall system performance and cost effectiveness are improved.

To achieve an increase in velocity, the air influx well geometry has been changed from a constant cross-section duct to a duct of decreasing cross-section along the downward flow direction, similar to a venturi. As the cross-sectional area decreases, the air velocity increases to a maximum at the minimum cross-section at the bottom of the upper opaque section of the influx well. The ratio of maximum velocity to inlet velocity is essentially the ratio of the full inlet cross-sectional area to the minimum cross-sectional area. The lower, perforated section of the influx well is structured to have an outflow cross-sectional area equal to or less than the minimum cross-sectional area, to maintain the maximum velocity level for air flow through the pore spaces of the contaminated soil zone.

Practical embodiments of the invention comprise wells of decreasing cross-section which have either a gradual reduction—conical with a circular cross-section well—or a stepwise taper with a series of constant flow area duct segments of decreasing cross-sectional areas. In either case any desired minimum cross-sectional area can be achieved.

The more efficient stripping action due to the increased velocity makes it possible to strip the volatile compounds at a higher rate, and render some of the less volatile residual compounds as well as the weathered organics amenable to stripping. The overall benefit is a reduction in operating time and cost for a given remediation task, with only minor changes to the air influx wells.

BRIEF DESCRIPTION OF THE DRAWINGS

A better understanding of the invention may be gained by reference to the following Detailed Description in conjunction with the accompanying drawings in which.

DETAILED DESCRIPTIONS OF THE PREFERRED EMBODIMENTS

Figure 1:
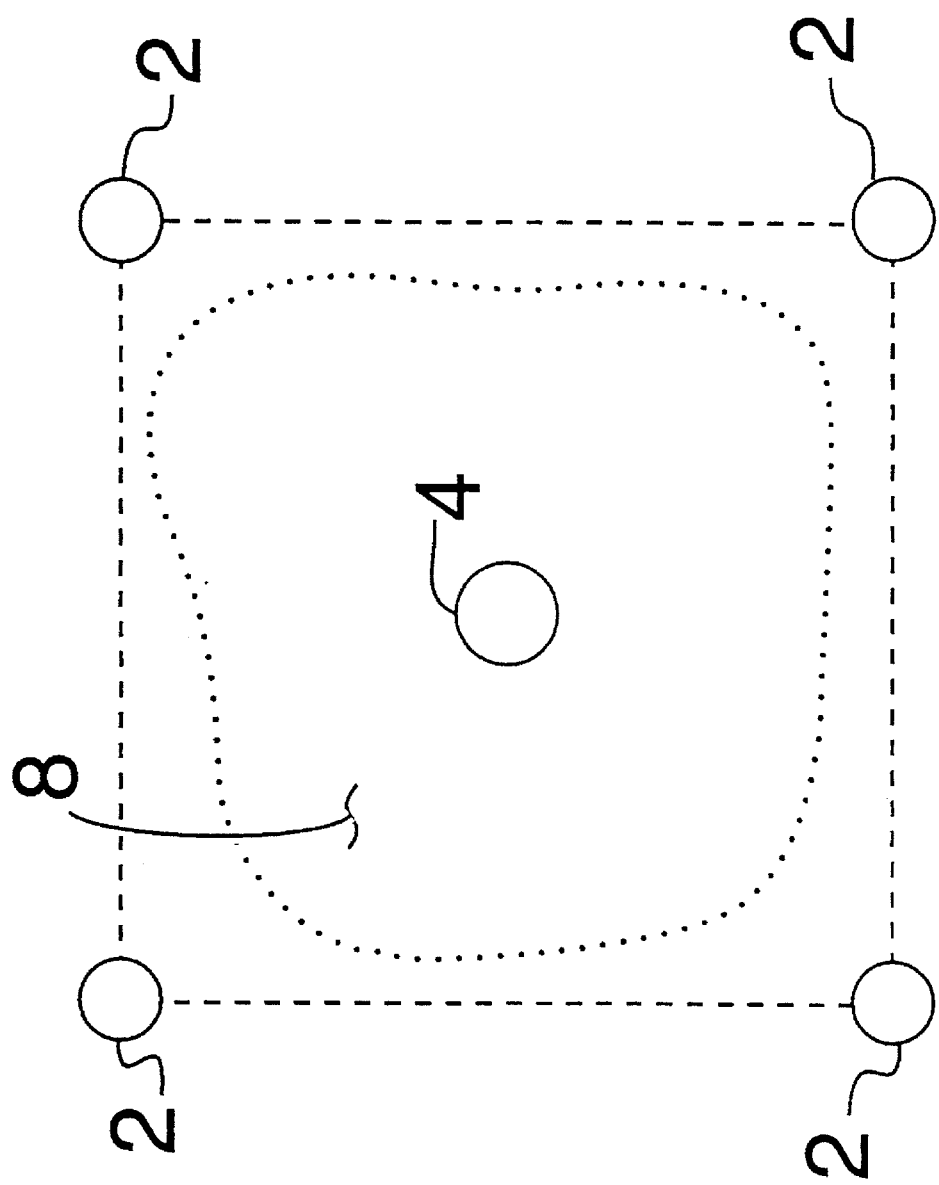
FIG.1 is a plan view of a module of the Enhanced Vapor Extraction system showing an extraction well surrounded by an array of air influx wells.

Referring to FIG. 1, the plan view of a module of the Enhanced Vapor Extraction system is shown, with air extraction well 4 centered in an array of air influx wells 2. In this example four air influx wells 2 are shown in a square array, bounded by dashed lines. The contaminated soil zone to be remediated is that contained within the dashed square in plan view and indicated by a dotted circumference.

Figure 2:
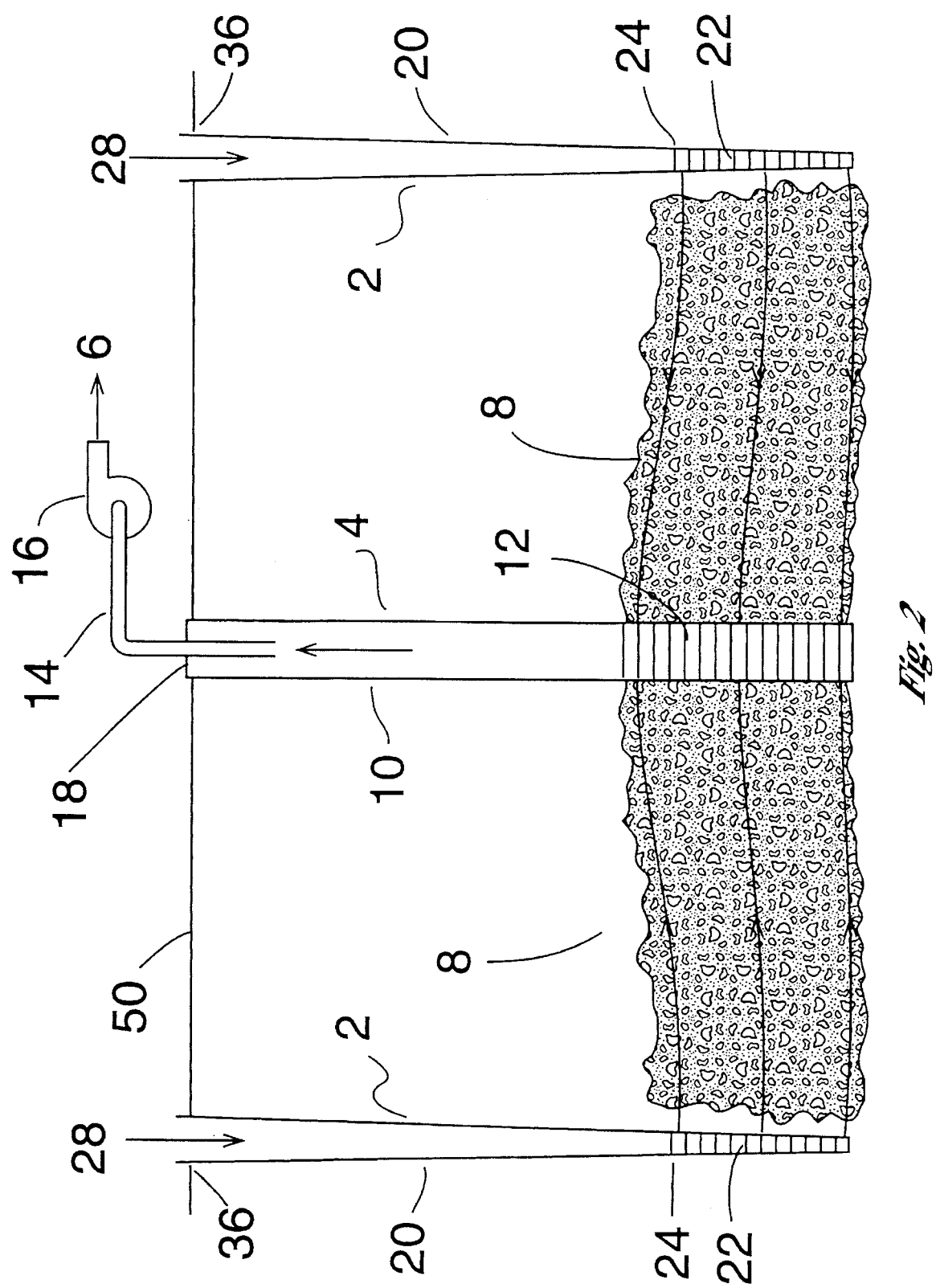
FIG.2 is an elevation of the module of the Enhanced Vapor Extraction System with conical air influx wells, in which the arrows represent flow directions.

Referring to FIG. 2, an elevation of the module of the Enhanced Vapor Extraction System is shown, with air extraction well 4 and conical air influx wells 2. Each influx well 2 is conical in cross-section and consists of upper opaque section 20 and lower perforated section 22. The upper section 20 cross-sectional area is reduced from a maximum at inlet 36 at ground level 50 to a minimum area 24 at the depth of the contaminated soil 8, as indicated diagrammatically. The lower perforated section 22 is designed to have an effective cross-sectional outflow area equal to or less than the minimum cross-sectional area 24.

Contaminated soil 8 is indicated to extend between extraction well 4 and influx wells 2. Extraction well 4 is of constant cross-section, typically a cylindrical tube, and consists of lower perforated inlet section 12 and upper opaque section 10. Section 10 at its outlet at ground level 50 is provided with an air tight lid 18 through which a conduit 14 is connected to air displacement unit 16. Unit 16, which can take the form of a vacuum pump or suction blower, exhausts to vapor disposal 6, which can take the form of re-use (typically as fuel for an internal combustion engine) or immobilization (typically adsorption on an activated carbon bed).

Figure 3:
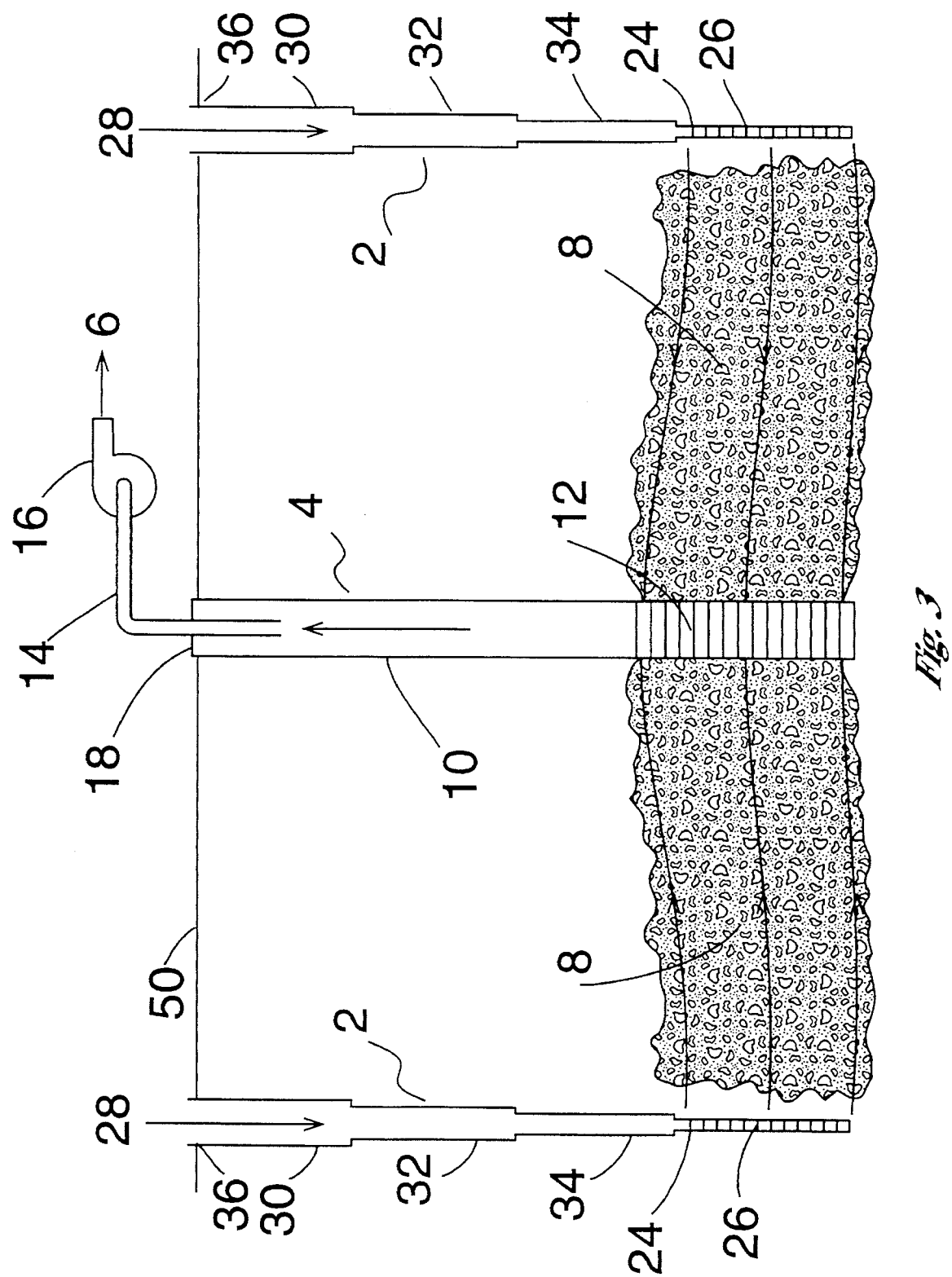
FIG. 3 is an elevation of the module of the Enhanced Vapor Extraction System with stepwise tapered air influx wells, in which the arrows represent flow directions.

Referring to FIG. 3, an elevation of the module of the Enhanced Vapor Extraction System is shown, similar to FIG. 2, but with stepwise tapered air influx wells instead of conical air influx wells. All other features in FIG. 3 are identical to those in FIG. 2. In FIG. 3 the reduction in flow cross-sectional area of the upper opaque section of an air influx well 2 from that at inlet 36 to minimum flow cross-sectional area 24 is accomplished by a series of successively smaller diameter cylindrical sections typically indicated by numerals 30, 32 and 34. In practice numerous diminishing cylindrical sections can be placed end to end to achieve the desired reduction in cross-sectional flow area and corresponding maximum air velocity. The final perforated section 26 is designed to have the same flow area as minimum flow area 24.

Referring now to FIG. 2 and FIG. 3, the operation of the Enhanced Vapor Extraction System is illustrated, noting that the arrows on FIG. 2 and FIG. 3 represent air flow directions. Activation of unit 16 produces a vacuum in upper section 10 of extraction well 4 and sets up an open loop air circulation from atmosphere 28 to vapor disposal 6, as shown by the arrows. Air from the atmosphere 28 accelerates down the opaque upper section of air influx wells 2 from inlet 36 to a maximum velocity at minimum area 24 and then flows through perforated sections 22 in FIG. 2 or perforated sections 26 in FIG. 3 and through the pore spaces of the contaminated soil zone 8 to perforated inlet section 12 of extraction well 4. In its flow through the contaminated soil zone 8 the high-velocity air strips the volatile compounds and some residual organics from the soil surfaces and pore spaces and entrains them into the air flow. The mixture then flows into the perforated section 12 of air extraction well 4, upward in extraction well opaque section 10 through conduit 14 to the inlet of air displacement unit 16 to vapor disposal means 6. If disposal means 6 takes the form of re-use, the air-vapor mixture can be used as fuel in an internal combustion engine. If disposal means 6 takes the form of immobilization, the vapor can be adsorbed on an activated carbon bed and the clean air returned to the atmosphere. In either case the disposal is effected in an environmentally sound manner.

The heart of the invention is the provision of an increase in air velocity through the contaminated soil zone over the velocity obtainable from constant-area tubular air influx wells. In the embodiments shown the velocity increase is effected by a gradual or stepwise tapering of the air influx wells. The advantages realized are those stated in the above Objects and Summary of the Invention. Other realizations of the present invention are possible without departing from the spirit and scope of the invention as delineated in the appended claims.

I claim:

1. A system for the in-situ remediation of a contaminated soil zone comprising:

a. an air influx well open to the atmosphere located outside said contaminated zone but traversing an entire depth of said contaminated soil zone, said air influx well tapering from a maximum cross-sectional area at an upper end open to the atmosphere to a minimum cross-sectional area at an opposite lower end;

b. perforations in said air influx well paralleling only a vertical extent of said contaminated soil zone;

c. an air extraction well located within said contaminated zone traversing the entire depth of said contaminated soil zone;

d. perforations in said air extraction well placed only within the vertical extent of said contaminated soil zone;

e. an air displacement unit connected in an airtight manner to said air extraction well, capable of producing a vacuum in said air extraction well and thus creating a circulation of atmospheric air (i) down said air influx well and through said perforations in said air influx well, the tapering of said air influx well accelerating said circulation of atmospheric air to a maximum velocity through said influx well perforations, (ii) further across through said contaminated soil zone, thereby stripping and entraining contaminants from said contaminated zone, the maximum velocity maximizing a rate of stripping and entraining contaminants from said contaminated zone, (iii) further through said perforations in said air extraction well into said air extraction well and (iv) upward through said air extraction Well into said air displacement unit; and f. a contaminant disposal means connected to said air displacement unit.

2. The system of claim 1 wherein said contamination comprises volatile organic compounds, weathered organic compounds, and residual organics.

3. The system of claim 1 wherein said air influx well comprises a plurality of air influx wells located around a periphery of said contaminated soil zone.

4. The system of claim 3 wherein said air extraction well comprises a plurality of air extraction wells.

5. The system of claim 3 wherein said influx wells taper linearly to a minimum cross-section.

6. The system of claim 5 wherein said influx wells are circular tubes with a conical taper.

7. The system of claim 3 wherein said influx wells taper stepwise to a minimum cross-section.

8. The system of claim 7 wherein said influx wells are of circular tubular cross-section and consist of a succession of tubes of diminishing diameters.

9. A method of in-situ remediation of a contaminated soil zone using a system comprising an air influx well open to the atmosphere located outside said contaminated zone but traversing an entire depth of said contaminated soil zone, said air influx well tapering from a maximum cross-sectional area at an upper end open to the atmosphere to a minimum cross-sectional area at an opposite lower end; perforations in said air influx well paralleling only a vertical extent of said contaminated soil zone; an air extraction well located within said contaminated zone traversing the entire depth of said contaminated soil zone; perforations in said air extraction well placed only within the vertical extent of said contaminated soil zone; an air displacement unit connected in an airtight manner to said air extraction well, capable of producing a vacuum in said air extraction well and thus creating a circulation of atmospheric air (i) down said air influx well and through said perforations in said air influx well, the tapering of said air influx well accelerating said circulation of atmospheric air to a maximum velocity through said influx well perforations, (ii) further across through said contaminated soil zone, thereby stripping and entraining contaminants from said contaminated zone, the maximum velocity maximizing a rate of stripping and entraining contaminants from said contaminated zone, (iii) further through said perforations in said air extraction well into said air extraction well and (iv) upward through said air extraction well into said air displacement unit; and a contaminant disposal means connected to said air displacement unit, said method comprising the steps of:

a. activating said air displacement unit connected in an airtight manner to said air extraction well to produce a vacuum in said air extraction well and thus create a circulation of atmospheric air down said air influx well, through said perforations in said air influx well, further across through said contaminated soil zone, thereby stripping and entraining contaminants from said contaminated zone, and further through said perforations in said air extraction well into said air extraction well and upward through said air extraction well into said air displacement unit, and lastly to said contaminant disposal means; and b. disposing said stripped and entrained contaminants in said contaminant disposal means.

10. The method of claim 9 wherein sad contamination comprises volatile organic compounds, weathered organic compounds and residual organics.

11. The method of claim 9 wherein said air influx well comprises a plurality of air influx wells located around the periphery of said contaminated zone.

12. The method of claim 11 wherein said air extraction well comprises a plurality of air extraction wells.

13. The method of claim 11 wherein said influx wells taper linearly to a minimum cross-section.

14. The method of claim 13 wherein said influx wells are circular tubes with a conical taper.

15. The method of claim 11 wherein said influx wells taper stepwise to a minimum cross-section.

16. The method of claim 15 wherein said influx wells are of circular tubular cross-section and consist of a succession of tubes of diminishing diameters.

\* \* \* \* \*